United States Patent [19]

Zeidler

[11] Patent Number: 5,269,149
[45] Date of Patent: Dec. 14, 1993

[54] METHOD FOR LONG RANGE TRANSCONTINENTAL AND TRANSOCEANIC TRANSPORT OF FRESH CHILLED MEAT

[75] Inventor: Gideon Zeidler, Davis, Calif.

[73] Assignee: The Regents of the University of California, Oakland, Calif.

[21] Appl. No.: 868,721

[22] Filed: Apr. 14, 1992

[51] Int. Cl.⁵ .......................... F24F 3/16; B60H 1/32
[52] U.S. Cl. .......................................... 62/78; 62/60; 62/62; 62/239
[58] Field of Search .................... 62/60, 62, 78, 239

[56] References Cited

U.S. PATENT DOCUMENTS

| | | | |
|---|---|---|---|
| 2,353,909 | 7/1944 | Lager | 62/62 |
| 2,556,418 | 6/1951 | DelMar | 62/62 |
| 2,633,714 | 4/1953 | Wehby | 62/62 |
| 2,677,246 | 5/1954 | Wehby | 62/78 X |
| 3,349,574 | 10/1967 | Glaser | 62/239 |
| 4,505,126 | 3/1985 | Jones et al. | 62/239 |
| 4,566,282 | 1/1986 | Knoblaunch | 62/62 X |
| 4,655,048 | 4/1987 | Burg | 62/78 |
| 4,833,892 | 5/1989 | Wassibauer et al. | 62/78 |
| 5,029,450 | 7/1991 | Takano et al. | 62/239 |
| 5,065,587 | 11/1991 | Howland et al. | 62/239 X |

FOREIGN PATENT DOCUMENTS

| | | | |
|---|---|---|---|
| 2287074 | 11/1990 | Japan | 62/60 |
| 997192 | 7/1965 | United Kingdom | 62/60 |

OTHER PUBLICATIONS

C. O. Gill and N. Penney, *Recent Advances and Developments in the Refrigeration of Meat Chilling*, Proceedings of Meetings of: Commission C2, pp. 521-524 (Sep. 10-12, 1986).

Primary Examiner—Henry A. Bennet
Assistant Examiner—Christopher Kilner
Attorney, Agent, or Firm—Hana Dolezalova

[57] ABSTRACT

A method for long range transcontinental or transoceanic transport of fresh chilled meat. The method concerns a transport of vacuum packaged chilled beef, pork or lamb meat or poultry or fish in refrigerated containers wherein one part of the container is filled with the frozen meat and the fresh non-frozen but chilled meat is placed in the close proximity of the frozen meat and insulated with foamed polystyrene laminated on both sides with sheets of insulated material. The chilled meat is stored in controlled atmosphere containing less then 1% of oxygen.

8 Claims, 1 Drawing Sheet

METHOD FOR LONG RANGE TRANSCONTINENTAL AND TRANSOCEANIC TRANSPORT OF FRESH CHILLED MEAT

BACKGROUND OF THE INVENTION

1. Field of Invention

This invention concerns a method for long range transport of fresh chilled meat. Particularly, this invention concerns a transport of vacuum packaged chilled beef, lamb or poultry meat or fish in refrigerated containers wherein one part of the container is filled with the frozen meat and the fresh non-frozen but chilled meat is placed in the close proximity of the frozen meat and insulated with foamed polystyrene laminated on both sides with aluminum sheets of insulated material and wherein there is controlled atmosphere within the insulated compartment.

2. Background Art and Related Art Disclosures

Long distance transportation of fresh meat has always presented a challenging problem. Originally, meat was processed by salting, drying, smoking or by other methods. However, these methods greatly impair the taste and utility of the meat. With an advent of refrigeration, the preservation of the meat became somehow easier but the transportation over the extended time disallowed the transport of fresh non-frozen meat. This problem is particularly apparent for long range transoceanic transport of fresh meat.

A revolutionary milestone in refrigerated transportation was the development of highway trailers or TOFC (trailer on flat car) which allowed the disconnection of the trailer from the car (tractor) and delivery of the cargo by road, rail, sea or air without exposing it to unfavorable environmental conditions. The marine version of this container which Was developed in the 1960's relieved the steamship companies from constructing inflexible and expensive refrigerated ship. Airfreight of meats and fish, as well as other perishable foods was developed in post World War II and provided fast transportation but uses ice, dry ice, and insulated packages, as needed. Short delivery time and flying at high altitude where temperatures are cold enable airlines to deliver perishable goods without mechanical refrigeration. However, temperature control of meats and fish is not accurately controlled. The latest development in refrigerated transportation is the superchill technology which utilizes microcomputer-controlled linear inverter rotary compressor, which constantly adjusts its r.p.m. in response to temperature demand. This system was found superior to off/on control of standard compressors. Dual refrigeration coils minimized temperature to fluctuation during defrost cycles. A modified atmosphere system is also built into the container. However, maintaining the gas composition for long periods of transportation or storage is still highly inaccurate.

The major issue in long range refrigerated transportation remains the many specific requirements of the various foods when chilled or frozen. There are major difference in transporting chilled cut flowers, vegetables, fruit, red meat, fish, poultry or a variety of frozen foods. The refrigerated container and truck companies have problems in efficiently scheduling the shipment of a variety of products back and forth with the most appropriate containers. In the United States, only 50% of the containers can maintain temperature at $-15°$ C. and very few superchill containers are available. These containers are much more expensive and it is wasteful to use them for other purposes. Furthermore, as containers become larger and larger, that is 20, 40, and 45 feet long—many users cannot fill them with one product only. Therefore, container temperature is a compromise of the specific needs of the various products.

Since the frozen meat looses many of its qualities, it has long been an aim of meat processing plants and transportation companies to develop the new refrigeration system which would allow the transportation of fresh meat over long distances. Refrigeration containers having a regular refrigeration technology have been developed and used. These regularly refrigerated containers, however, have many problems. First, due to the switching on/shutting-off of refrigerator generator, there is a certain degree of fluctuation (within $3°-5°$ C.) of the temperature within the container. Due to the condensation and the water evaporation, which occurs only in carcasses where there is no packaging, ice forms in between packages of meat or in meat, causing so called "cold spots", that is a certain degree of freezing in places where the ice crystals form. Through the container's doors, certain degree of heat and humidity penetrates to the inside of the container, particularly during the loading and during transportation.

It would, therefore be of utmost importance to have available method including containers which would prevent the fluctuation of the temperatures within the container, formation of the ice or uneven refrigeration due to switching on/shutting off refrigeration system, evaporation, penetration of heat and the effects of loading.

Recently, the method for transportation of combined chilled and frozen venison meat was presented at the 33rd Annual Meat Science Institute Conference in Athens, Ga., Apr. 14-17, 1991. The method comprised placing the vacuum packages of chilled venison meat in standard frozen food containers which were also packed with frozen venison meat. The venison meat retained high quality, and palatability and low microbial counts, and rancidity. However, it is a general knowledge that venison meat is one of the most stable meats which can withstand, without spoilage, long range transportation in regular refrigerated container for about 4 weeks although quality and palatability have deteriorated significantly.

Other red meats such as beef, pork or lamb as well as poultry or fish are, however, much more sensitive to spoiling having more shorter shelf life generally around 1-2 weeks when kept fresh and chilled in standard refrigerator. It would thus be greatly advantageous to have available a method which would extend the shelf life of fresh chilled meat for at least 8-10 weeks, typically needed for storage, transcontinental transportation and particularly for transoceanic transportation.

It is therefore, a primary object of this invention to provide a method for long range transcontinental and transoceanic transportation or extended storage period.

SUMMARY

One aspect of the current invention is a method for extension of shelf life of fresh chilled beef, pork, and lamb meat and poultry or fish while preserving its quality and flavor.

Another aspect of the current invention is a method wherein the meat is slaughtered and processed under high sanitation conditions in chilled atmosphere, preserved by spraying with ascorbic and/or citric acid solution to reduce surface pH and then vacuum packed.

Another aspect of the current invention is a method wherein immediately after packing the chilled meat is loaded into the refrigerated container having controlled atmospheric conditions wherein the atmosphere comprises an inert gas, no more than 40% of carbon dioxide and less than ½% of oxygen, and wherein at least 20-25% of the container is loaded with frozen meat.

Still another aspect of the current invention is a method wherein the chilled packed meat is insulated with foamed polystyrene material laminated with insulating foil sheets on both sides.

Yet another aspect of the current invention is a method wherein the fresh meat is kept constantly chilled at temperature around $-1°$ C. and the fluctuation is only ¼° C. at any given time.

DETAILED DESCRIPTION OF THE INVENTION

Figure 1:
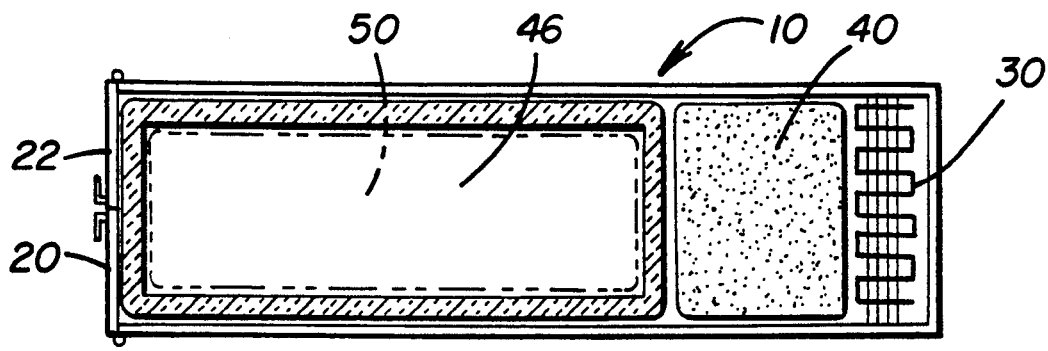
FIG. 1 depicts a container for storage of chilled meat having three possible configurations (A), (B), and (C).

This invention concerns a new method for preservation of fresh chilled beef, pork, chicken, and lamb meat or fish. The method extends a shelf life of the fresh chilled meat from 1-2 weeks to about 8-10 weeks needed for transportation, storage, and distribution of the meat without impairment in quality, texture or taste.

The method improves the temperature control system in standard marine frozen food containers used for transoceanic shipment and for land transportation over long distances, of meats in superchill system and eliminates temperature fluctuation and formation of hot and cold spots, through improved insulation which divides the container into smaller enclosed compartments.

The method is further developed as a portable system which can be removed at the end of the voyage or transportation, thus providing flexibility to the usage of the container.

The method includes an insulation system which can be installed in only one part of the container, thus enabling the usage of the container for several chilled and frozen products kept apart and maintained at different temperatures.

The method further allows to accurately control microbial growth, rancidity, and enzymatic reaction in meats, thus allowing extended shelf life sufficient for transoceanic shipment and for local distribution and at the same time retaining quality of chilled meats.

The method has several new features which together allow the transport of chilled meat in standard refrigerator container for extended period of time.

One of the features is the insulation structure of the insulating material. Insulation structure can be any material which is able to maintain certain temperature, which is impenetrable for oxygen, air, and water, and which is heavy duty to withstand rough handling during loading. The material most suitable for insulation is foamed polystyrene formed into sheets (FPS) with external layer of foilpak 926. The new insulation material consists of two sheets of aluminum foil, laminated by polyethylene to both sides of a heavy duty kraft paper, and reinforced with glass fibers running in the long direction. FPS with external and internal layers of foilpak 926 performed the best as to reducing temperature fluctuation. Foilpak 926 is available from Omega MFG, Greenmount, New Zealand, and is an extremely effective thermal insulation material when used with an air space. Because of its high thermal reflectivity and low emissivity of its aluminum foil surfaces, the combination makes an excellent barrier to heat flow by radiation and convention. The combination of foamed polystyrene and foilpak 926 created effective low cost insulating system which could be specifically installed to the size of the chilled meat load and be removed at the end of the voyage providing full flexibility to the usage of the container on the way back.

The most important feature of this invention is the placement of the chilled meat within the container. In refrigerated marine container and in refrigerated trucks, the refrigeration unit is located in the front of the container where the doors are located in the back. The cold air stream is moving from top of the front backwards as well as vertically from ceiling or floor ducts. Furthermore, the refrigerated container is not completely sealed and therefore external air and humidity penetrate into the container adding to the cooling load and to the non-uniformity of internal temperature. This penetration increases with the speed of traveling. Furthermore, heat is also penetrating through the container's insulated walls. As a result, the temperature in the container is not uniform and constantly must be kept down by the refrigeration unit. The amount of loaded cargo and its arrangement in the container also add to the problem due to restriction of airflow. In order to minimize the temperature and variability in chilled beef meat, it was placed together with frozen beef meat where portable insulation separated it from the frozen meat as well as from the influence of doors, walls, ceiling, and floor. The structure of the insulation and the location of the chilled meat in the truck were found to have major effects on temperature control within the chilled meat compartment.

Effect of the location of the chilled meat in the container was tested in three configurations as seen in FIG. 1. Referring to FIG. 1, twenty feet marine refrigeration container 10 has in its front part the refrigeration unit 30. In the rear part, there are two doors 20 and 22, The block of frozen meat 40 is located generally between the insulation compartment 46 wherein the fresh chilled meat is stored. The configurations A, B and C show the position of the chilled meat 50 within the container with respect to the refrigeration unit 30 and the block of the frozen meat 40. Insulation compartment 46 is used for storing the chilled meat 50.

Figure 1A:
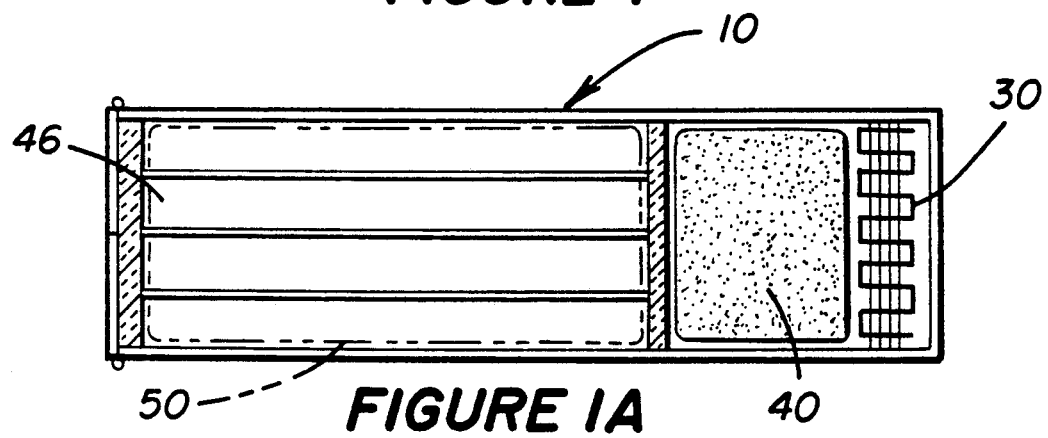
Figure 1B:
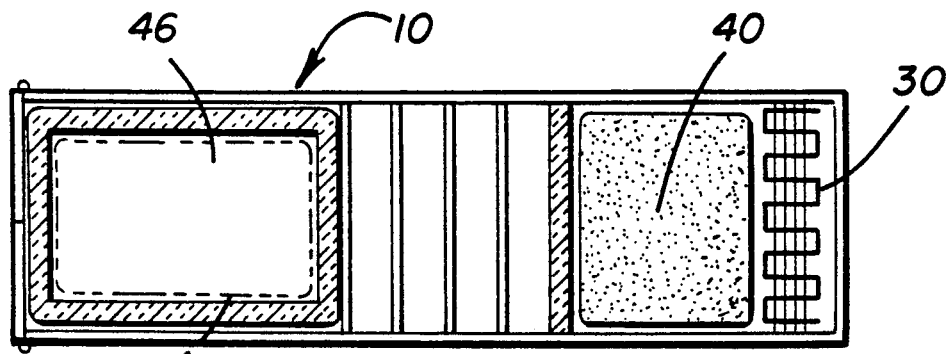
Figure 1C:
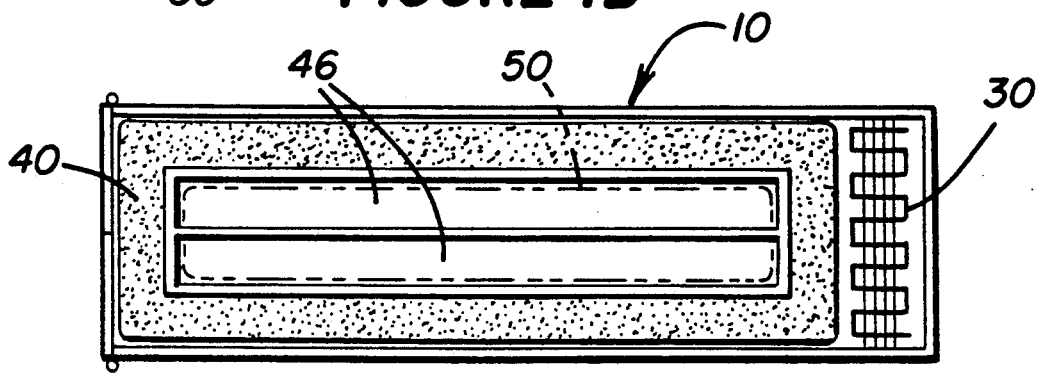

FIG. 1A shows the meat placed at the back of the truck. In configuration FIG. 1B, the chilled meat was placed in the center of the truck. In configuration of FIG. 1C, the meat was surrounded with frozen meat.

Better temperature control was achieved when configuration 1A was used where frozen meat is instead located in the front and chilled meat is located in the back and it is enclosed by the compartment insulation. Furthermore, when insulation structure was used, the chilled meat held at $-1°$ C. fluctuated at only $\pm 0.5°$ C. during the three week trip after reaching equilibrium. However, the neighboring frozen meat which was held at $-20°$ C., experienced significant temperature fluctuation of about $2°-4°$ C. before it settled down. Temperature uniformity was also significantly improved and probes at three different locations in the chilled meat compartment demonstrated similar time temperature profile.

In any of these configurations, the frozen meat serves as a cushion in absorbing the uneven airflow and the fluctuations due to the compressor off/on cycles and the evaporator's defrosting cycles. The improved temperature control of the chilled meat in the back of the container could be due to its enclosure in the superior insulation which allow the chilled meat at $-1°$ C. not to be affected by low temperature of the frozen meat and prevent the strong and uncontrolled movement which exist in the refrigerated container. Transporting temperature information through the satellite by using Autolog time monitor, Remonsys Ltd., Bristol, England, enables the control and correction of refrigeration activity as needed by the sender as data could arrive to the monitoring place in about one hour.

For transport of beef, pork, lamb, chicken or fish, the refrigerated container must be equipped with controlled atmospheric option. The atmospheric option assures that, as much as possible, the atmosphere within the container will contain between 20°–40° C. of carbon dioxide and must not contain more than ½% of oxygen. Otherwise, any inert gas, such as nitrogen, helium, argon, freon, krypton, and other gases may be used.

Before the meat, such as beef, pork, chicken, lamb or fish were vacuum packed, they were washed and treated with 1% citric or ascorbic acid solution to reduce surface pH, and thus to preserve the meat against mold, bacterial growth, and oxidation. Then after the transportation, the quality of the meat was checked for microbial growth, lipid oxidation, and sensory evaluation was made.

Beef, pork, chicken or fish are less resistant to microbial spoilage than venison, partially due to lower pH of the meat. The microbial growth of chilled meat could reach $10^7$ levels during three weeks in transit in standard refrigerated container as affected by temperature control, packaging, and initial microbial contaminating. When the insulation system of this invention was used and precise temperature control was achieved, microbial growth of vacuum packaged beef was significantly retarded leaving considerable shelf life for local distribution, as seen in Table 1. Both modified atmosphere and organic acid was were used to keep microbial growth down. However, as initial microbial growth varied greatly from plant to plant, strict sanitation practices of plant, cutting knives, personal and the refrigerated containers were necessary as well as rapid chilling of the slaughtered animals in order to keep initial microbial growth at low levels. It was also found that the new system provided better microbial growth control than the air freighted system where shipment was completed in shorter time.

Lipid oxidation of the transported beef was determined by the TBA number, which has been the most extensively used for all measurements for lipid oxidation during processing or storage of meats. It is expressed as milligrams of malonaldehyde (or malondialdelyde) per kilogram of tissue. Lipid oxidation shortens the shelf life of meats and foods due to development of off flavor and off odor, sometimes associated with indescribable changes in color, texture, and nutritional values. Venison is naturally low in fat and therefore, is less sensitive to rancidity than beef and pork, and the vacuum packaging which reduces oxygen content further protect it. For comparison, a survey of content of malonaldelyde in variety fresh meats and cuts (beef, pork, and chicken) in retail supermarkets showed that 60 of the samples ranged between 1.0–6.0 mg/kg where 38% contained less than 1.0 mg/kg (16). In the meat industry, 2.0 mg/kg and lower are considered as very good values.

Most chefs that were asked about the marine shipped chilled meat preferred it over frozen and over airfreighted due to prolonged aging that took place during shipment. This was particularly true for beef. The pH of meat found to be 5.7 upon arrival and drip losses were also small (around 1.5–1.7%).

UTILITY

The beef, pork, chicken, lamb or fish is an important segment of the food. Its preservation in fresh state is very important because use of any kind of preservatives or freezing methods change the quality of the meat, particularly its taste and texture.

The major potential of this method is the long distance, such as transoceanic or transcontinental export, of fresh meat. The method is particularly suitable for transport and preservation of less stable large volumes of chilled meats such as beef, pork, chicken, and fish. Most beef is preferred chilled rather than frozen. Therefore, hanged carcasses are preferred over vacuum packaged meats for, for example, the Japanese and European markets. The new system could help in providing chilled carcasses and other high quality chilled meats to the satisfaction of the consumers in the U.S.A and other countries.

EXAMPLE 1

Transportation of Chilled Meat

4000–7000 pounds of vacuum packaged chilled beef meat was loaded together with up to 13,000–16,000 pounds of frozen beef into 20' marine containers which can maintain $-20°$ C. temperature (Mitsubishi, Nippon Fruehauf). The chilled beef was separated from the frozen beef meat by experimental insulation made of foamed polystyrene plates which were laminated by sheets of Foilpak 926 made by Omega MFG and Marketing Ltd., Greenmount, New Zealand. The insulation layer was not hermetically sealed. The location of the chilled beef in the container, and the structure of the insulation material were tested in seven voyages from Aukland, New Zealand to San Francisco, Ca. which lasts around three weeks from loading at the processing plant until unloading at Durham Meat Co., San Jose.

Temperature monitoring of both chilled and frozen beef meats, as well as air temperature in the two sections, was conducted by AUTOLOG—Time Temperature monitor, Remonsys Ltd., Bristol, England. Several temperature sensor probes were placed in both frozen meat and chilled meat and the fluctuation in the temperature was followed. Sensor were also placed in other places in containers.

Protocols during 3 weeks voyage show that the temperature of the chilled meat was around $-1°$ C. and fluctuation of temperature in the chilled meat was $\pm 0.5°$ C.

The quality of the meat was determined by the measurement of microbial growth and was compared to an air freight. The results are shown in Table 1. There are differences in microbial growth found which depend on the type of insulation used. The best results were obtained when foamed polystyrene was used covered with external and internal Polypak 926 foil.

TABLE 1

The Effect of Insulation Structure of Microbial Growth Expressed as Total Plate Count

| INSULATION | INITIAL MICROBIAL COUNT | POST SHIPMENT COUNT (CHILLED) | POST SHIPMENT COUNT (FROZEN) |
|---|---|---|---|
| Foamed Polystyrene (FP) | $9.8 \times 10^4$ | $9.2 \times 10^6$ | $1.3 \times 10^5$ |
| FP & External Polypak 926 | $1.3 \times 10^4$ | $8.4 \times 10^4$ | $4.2 \times 10^8$ |
| FP & External & Internal Polypak 926 | $1.2 \times 10^4$ | $2.3 \times 10^4$ | |
| "(Second Shipment) | $3.2 \times 10^8$ | $3.5 \times 10^4$ | |
| Airfreight | — | $3.2 \times 10^5$ | |

1. Three weeks of marine shipment, one week of airfreight delivery.
2. The chilled meat in the marine testing was located at the back of the container.

EXAMPLE 2

Preparation of Beef for Storage and Transportation

Beef is slaughtered and broken into cuts according to routine procedures. The processing area including cutting tables and knives were frequently sanitized, and room temperature was held round 50° F. The cuts were sprayed with cold 1% ascorbic acid just before vacuum packaging.

The vacuum packaged meat was immediately chilled to 30°-32° F. before being placed into corrugated cardboard boxes which stored in 30°-32° F. cold storage. The refrigerated containers were attached to the cold storage doors.

The blocks of thoroughly frozen meat of at least 20-25% of the container volume were loaded by moving from the blocks from the frozen meat storage. The insulation was made by laminating 1" of foamed polystyrene by sheets of Foilpak 926 (Omega MFG Ltd., Greenmount, New Zealand) on both sides of the polystyrene. The insulation was then built on wall ceiling and floors of the container in a manner which separated the frozen meat by build-in partition. The chilled meat was then moved from the chilled storage to the insulation compartment of the container. After the chilled meat was loaded, partitions were built within the insulated compartment of the container. The last partition was built near the door when the compartment was full. Temperature monitoring units (AUTOLOG Time Temperature monitor, Remonsys, Ltd., Bristol, England) are installed in different compartments and the constant record of the temperature was read every hour. The data were transferred to the shipper's headquarters by satellite and adjustments were made in the refrigeration schedule as needed. After the container doors were closed, the temperature of the meat was reduced to $-1°$ C. to $\pm 1°$ C. and kept that way throughout until the meat was unloaded to 1°-2° C. cold storage and stored at that temperature as needed.

What is claimed is:

1. A method for preservation of vacuum-packed fresh chilled meat for about 8 to 10 weeks by storing said fresh chilled meat in a refrigeration container suitable for transport of a frozen food, wherein said container is insulated with insulation comprising foamed polystyrene plates of about one inch thickness laminated on one or both sides with aluminum foil, said insulation dividing said container into smaller enclosed compartments, wherein said compartments are maintained at a super-chilled temperature with blocks of frozen meat stored within said compartments, wherein the fresh chilled meat is surrounded with said blocks of said frozen meat, and wherein said super-chilled temperature is maintained at about $\pm 1°$ C. with a fluctuation of about $\pm 0.5°$ C. and wherein formation of hot and cold spots is essentially eliminated.

2. The method of claim 1 wherein the container further comprises a controlled atmosphere option assuring that an atmosphere within the container contains a combination of an inert gas, 20-40% of carbon dioxide and less than 1% of oxygen.

3. The method of claim 2 wherein the container's insulation consists of two sheets of aluminum foil laminated by polyethylene to two sides of a paper reinforced with glass fibers.

4. The method of claim 3 wherein the temperature of the fresh chilled meat is maintained at a constant temperature of about $-1°$ C. and a temperature fluctuation is about $\pm 0.5°$ C.

5. The method of claim 4 wherein the temperature of the block of frozen meat is around $-20°$ C.

6. The method of claim 5 wherein additionally the blocks of frozen meat are stored outside of the insulation.

7. A method of claim 6 wherein the inert gas is selected from a group consisting of nitrogen, helium, argon, freon, and krypton.

8. A method for preservation of vacuum-packed fresh chilled meat for about 8 to 10 weeks by storing said fresh chilled meat in a refrigeration container suitable for transport of a frozen food, wherein said container consists of compartments insulated with insulation comprising foamed polystyrene plates of about one inch thickness laminated on one or both sides with aluminum foil, wherein said compartments are maintained at a super-chilled temperature with blocks of frozen meat surrounding said compartments, wherein the chilled fresh meat is stored within the compartments surrounded with said blocks of said frozen meat, and wherein said super-chilled temperature within the compartment is maintained at about $\pm 1°$ C. with a fluctuation of about $\pm 0.5°$ C. and where formation of hot and cold spots is essentially eliminated.

* * * * *